United States Patent [19]

McClaine

[11] 4,039,023
[45] Aug. 2, 1977

[54] METHOD AND APPARATUS FOR HEAT TRANSFER, USING METAL HYDRIDES

[75] Inventor: Andrew W. McClaine, Ventura, Calif.

[73] Assignee: The United States of America as represented by the Secretary of the Navy, Washington, D.C.

[21] Appl. No.: 661,069

[22] Filed: Feb. 25, 1976

[51] Int. Cl.² .................. F25B 13/00; F28D 15/00
[52] U.S. Cl. ............................................. 165/2; 62/4;
165/107; 165/DIG. 17
[58] Field of Search .................. 165/2, 107, DIG. 17;
62/4

[56] References Cited

U.S. PATENT DOCUMENTS 3,989,102  11/1976  Jaster et al. ..................... 165/107

OTHER PUBLICATIONS

MacKay, Hydrogen Compounds of the Metallic Elements, Spon, Ltd., London, pp. 20, 21, 22, 23, 40, 59, 65 (1966).

Primary Examiner—Leland A. Sebastian
Attorney, Agent, or Firm—R. S. Sciascia; Philip Schneider; Thomas McDonnell

[57] ABSTRACT

Heat transfer and thus temperature control of an environment is achieved by a method and apparatus which comprises withdrawing hydrogen from a first hydride reaction system in a two phase equilibrium at a certain temperature and pressure thereby causing a decomposition of a portion of the hydride, adding heat to the reaction system to compensate for the loss of heat caused by the endothermic hydride decomposition reaction, transferring the withdrawn hydrogen to a second hydride reaction system in a two phase equilibrium at a higher temperature and pressure thereby causing a formation of hydride and release of heat, and removing the heat created by the exothermic hydride formation reaction.

14 Claims, 7 Drawing Figures

METHOD AND APPARATUS FOR HEAT TRANSFER, USING METAL HYDRIDES

BACKGROUND OF THE INVENTION

The present invention pertains generally to heat transfer and in particular to heat transfer through the formation and decomposition of metal hydrides.

Presently several devices, often referred to as heat pumps, are utilized to transfer heat. They can be classified into two types. The first type of device operates by first compressing a fluid which at this step is in the gaseous phase. The pressurized gas is then passed through a heat exchanger and cooled by roomside air. The fluid changes state with the loss of heat and becomes a liquid. The heat of vaporization is thus transferred to an environment. The liquid then passes out of the heat exchanger, through an expander and into another heat exchanger. At this lower pressure the fluid has the tendency to boil with the addition of low temperature heat. Air from another environment supplies this heat through the heat exchanger and thus transforms the fluid to a gas again, the gas then returns to the compressor.

The other type of device is referred to as an absorption heat pump. This type like the first type utilizes a compression-vaporization cycle to transfer heat. The difference between the two types reside in the means for effecting compression of the vapor. With the compressor type of device, a mechanical compressor is used, whereas an absorption type of heat pump accomplishes compression by contacting the vapor with a medium which unites with the vapor.

The performance of heat pumps of either type are evaluated in terms of the coefficient of performance (C.O.P.). As a refrigerator the COP of a heat pump is calculated by C.O.P. = refrigerating effect/heat of compression. As a heater, the coefficient of performance for a heat pump is calculated by C.O.P. = heat delivered/heat of compression

SUMMARY OF THE INVENTION

It is therefore an object of the present invention to provide a novel method and apparatus for transferring heat.

Another object of this invention is to provide a method and apparatus which transfer heat more efficiently than presently possible.

These and other objects are achieved by the cooperation of two hydride reaction systems, one is in equilibrium at a certain temperature and pressure and the other is equilibrium at a higher temperature and pressure, in such manner that hydrogen is removed from the lower temperature-pressure system thereby causing hydride decomposition and making feasible heat absorption, and the hydrogen is then introduced into the higher temperature pressure system, thereby causing hydride formation and making feasible heat emission.

BRIEF DESCRIPTION OF THE DRAWINGS

A detailed description of the invention and the preferred embodiments thereof is made hereinafter in reference to the following drawings.

DETAILED DESCRIPTION OF THE INVENTION

Figure 1:
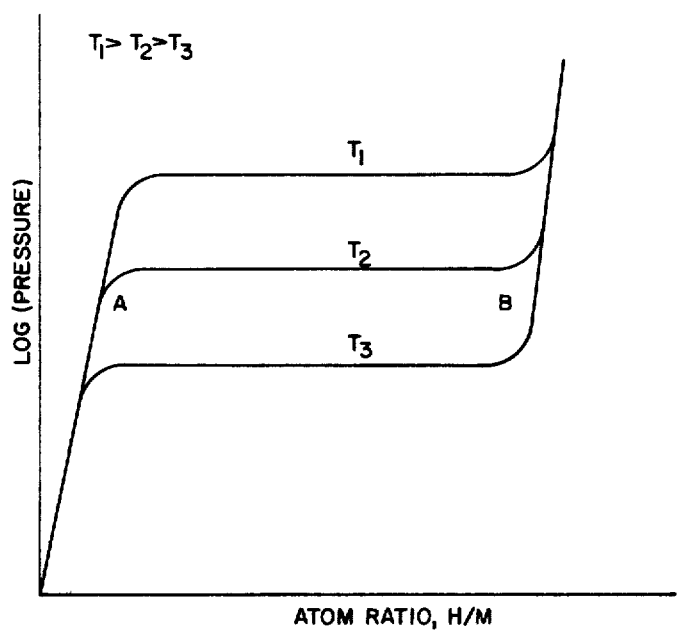
FIG. 1 shows an idealized equilbrium pressure-composition diagram.

The mechanism by which the present invention operates is explained in reference to the idealized equilibrium pressure-composition diagram given in FIG. 1. Starting at the lower left hand corner of the diagram, the equilibrium pressure increases steeply as hydrogen is combined with the metal and the atomic ratio H/M increases until point A is reached. Up to this point the solid consists of a solution of hydrogen in metal rather than a compound. If more hydrogen is supplied, a second phase appears in the solid and the addition of further hydrogen does not cause a further increase in pressure until point B is reached. The system is said to be at a two-phase equilibrium. At point B, all the solid has attained this phase and the solid has a certain composition. After point B, further enrichment of the solid with hydrogen requires a steep increase in pressure.

At a given temperature, therefore, each hydride is in equilibrium with a definite pressure of hydrogen, which also depends upon the quantity of hydrogen in the metal. At the two-phase equilibrium and at a given temperature the equilibrium pressure (also referred to as the decomposition pressure) is independent of the hydrogen concentration in accordance with the phase rule. In the single-phase region, below point A and above point B, the equilibrium pressure varies with both the temperature and hydrogen concentration. These relations hold irrespective of the nature of the hydride present.

It should be noted that most metal-hydride reaction systems experience hysteresis. The equilibrium pressure during decomposition may be 10 atmospheres higher than the pressure shown on the equilibrium pressure-composition diagram. In practice such discrepencies would be eliminated during the adjustment of the process and apparatus.

Since hydride decomposition is an endothermic reaction and the formation is an exothermic reaction, passing hydrogen from one hydride reaction system at equilibrium in the two-phase region to another hydride reaction system at equilibrium in the two-phase region causes the first system to lose heat and the second to gain heat. In order to restore both systems to their former equilibriums, heat is added to the first and is taken from the second. Hence heat may be removed from a cold environment by a low pressure and temperature equilibrium in a hydride reaction system and heat may be added to a warmer environment by a higher temperature and pressure equilibrium in a hydride reaction system.

Figure 2:
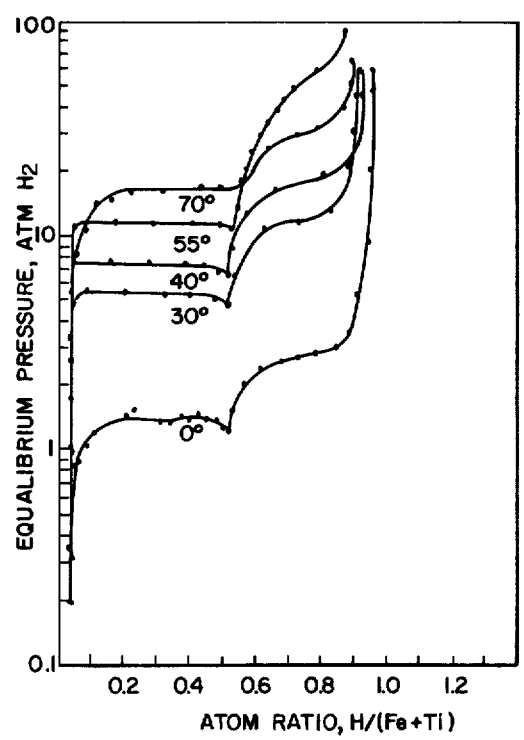
FIG. 2 shows an equilibrium pressure-composition diagram for H and FeTi.

FIG. 2 is the equilibrium pressure composition diagram for hydrogen and an iron titanium alloy. From this type of diagram the operating pressure and temperature for the process and apparatus of the present invention can be selected. For example, with the H/FeTi system, the lower pressure, i.e., the equilibrium pressure at the hydride reaction system which is being depleted of hydrogen would approximately be 1 atm if the temperature is 0° C. The pressure at the second system would approximately be 12 atm if the temperature is 30° C. The diagram for the other metals of this invention are readily available in the general literature, e.g., in S. C. Gary and A. W. McClaine *Metal Hydride for Energy Storage Applications. Navy Tech. Note N*-1393. June 1975. This article is herein incorporated by reference.

The present invention can be used in a variety of applications from heating or cooling a breaker of water to heating or cooling a house to heating a kiln. Regardless of the application, the hydride should have a number of properties for best operation. As a preliminary matter, the metal should be capable of thousands of cycles of absorption and desorption of hydrogen. The hydride should be stable for long periods of time at the operating temperature and pressure and be resistant to spontaneous combustion if brought in contact with air or oxygen. Environmentally the use of the hydride should be neutral or positive compared to the environmental effects of materials used in other heat pump devices. Also the metal and the hydride should be non-toxic.

Of primary importance in the selection of the metal are the $\Delta T/\Delta P$ factor, the M-number, the time of reaction at the lowest temperature, the specific heat of the metal, and the pressure range of operation. The $\Delta T/\Delta P$ factor is the ratio of the difference in ° C of two isotherms of an equilibrium pressure-composition diagram and the difference in atmospheres of the equilibrium pressures corresponding to the isotherms. This factor effects the COP number of a device in that a small factor would require a large pressure differential in order to operate the two hydride reaction systems at the desired temperatures. For a metal hydride to give a superior COP in the practice of the present invention, the $\Delta T/\Delta P$ factor is at least 2.0 and preferably at least 3.0, and most preferably at least 3.7.

The M-number provides a measure of the amount of energy which is transferred per unit mass of hydride. It is defined as the product of the maximum usable weight in kilograms of hydrogen which is reacted with the metal per kilogram of the metal and the enthalpy of the reaction of the hydrogen with the metal in kilocalories per kilogram of hydrogen. The M-number is at least 650 kcal/kg preferably at least 1050 kcal/kg, and most preferably at least 1650 kcal/kg.

The reaction time is the amount of time required for the metal-hydride system to reach either end of the two-phase equilibrium. It controls how much hydride is required to build a practical heat pump. If the reaction is too slow, too much metal would be required. The metal should provide a reaction time of about 20 minutes with a 6 minute maximum, preferred and a 5 minute maximum most preferred.

The specific heat of the material is an important factor because the material must cycle between its high temperature and its low temperature. The specific heat is at most 0.20 kcal/kg° C, preferable 0.15 kcal/kg° C, or less and most preferably no higher than 0.10 kcal/kg° C.

The maximum pressure of the operating pressure range is also important as it affects the amount of container material required in the apparatus. A high pressure requires a thick walled container, which is less desirable than a thin walled container. With presently available construction metals, the maximum pressure to be experienced in the apparatus should not be higher than 60 absolute atmospheres, preferable not higher than 50 absolute atmospheres and most preferable not higher than 40 absolute atmospheres. Of course if higher strength metals are developed, then these maximum pressures could be increased.

Several factors effect the rates of hydrogen-metal reaction, besides the nature of the metal. The cleanliness of the metal surface effects the rate of reaction. An oxide film, for example, often slows down the reaction rate initially. The smaller the particle size the faster is the reaction rate. This is not too surprising since a larger surface area for a given amount of solid would provide better diffusion and a larger site. Finally, the rate of reaction can be increased by the addition of a small amount of catalyst.

The selection of a particular metal-hydride is determined to a large degree on the intended use. Heating or cooling a house would require the hydride to operate, i.e., decompose and form at a temperature from about $-20°$ to about 50° C or whatever temperature range of the climate in which the house is located. Accordingly the metals would preferably be iron titanium or lanthanum pentanickel or mischmetal penta nickel, or mischmetal lanthanum pentanickel. For an application requiring higher temperatures, the alloys of magnesium nickel or mangesium-copper would be preferred, where the nickel or copper are alloyed with approximately 95 wt% magnesium.

The metals in the practice of the present invention may be prepared by any standard method. All are commercially available. It is important that the metals are not exposed to air, oxygen, silicon, or water because these substances inhibit the formation of the metallic hydride. It is preferred that the metals are in a fine particle form due to the increased surface area for reaction.

Not all possible compositions of the aforementioned alloys are equally valuable for the present invention. The preferred composition range for the iron titanium alloy is from 49.7 at % to 52.01 at. % titanium. Preferably the lanthanum penta nickel has from 15.4 at. % to 16.95 at. % of lanthanum with 16.7 at. % the most preferred. Mischmetal is a term which describes a commercial mixture of rare earths. Its approximate composition is cerium 50 wt %, lanthanum 27 wt%., neodymium 16 wt%., praseodymium 5 wt% and other rare earths 2 wt%. Preferably the mischmetal penta nickel has from 83.25 at % to 83.35 at . % nickel and most preferably 83.3 at. %. The preferred composition for the mischmetal lanthanum pentanickel is from 14.15 at. % to 14.2 at. % mischmetal from 2.45 at % to 2.55 at. % lanthanum, and from 83. at. % to 83.4 at. % nickel. Most preferably the mischmetal lanthanum comprises 14.17 at. % of mischmetal, 2.5 at. % of lanthanum, and 83.33 at % of nickel.

Examples of other metals which can be used for this invention are vanadium, niobium, palladium, magnesium, vanadium, vanadium-niobium alloys where the preferred alloy is 50 at % vanadium, and praseodymium penta-cobalt alloys having from 16.6 at. % to 16.7 at. % cobalt.

Figure 3:
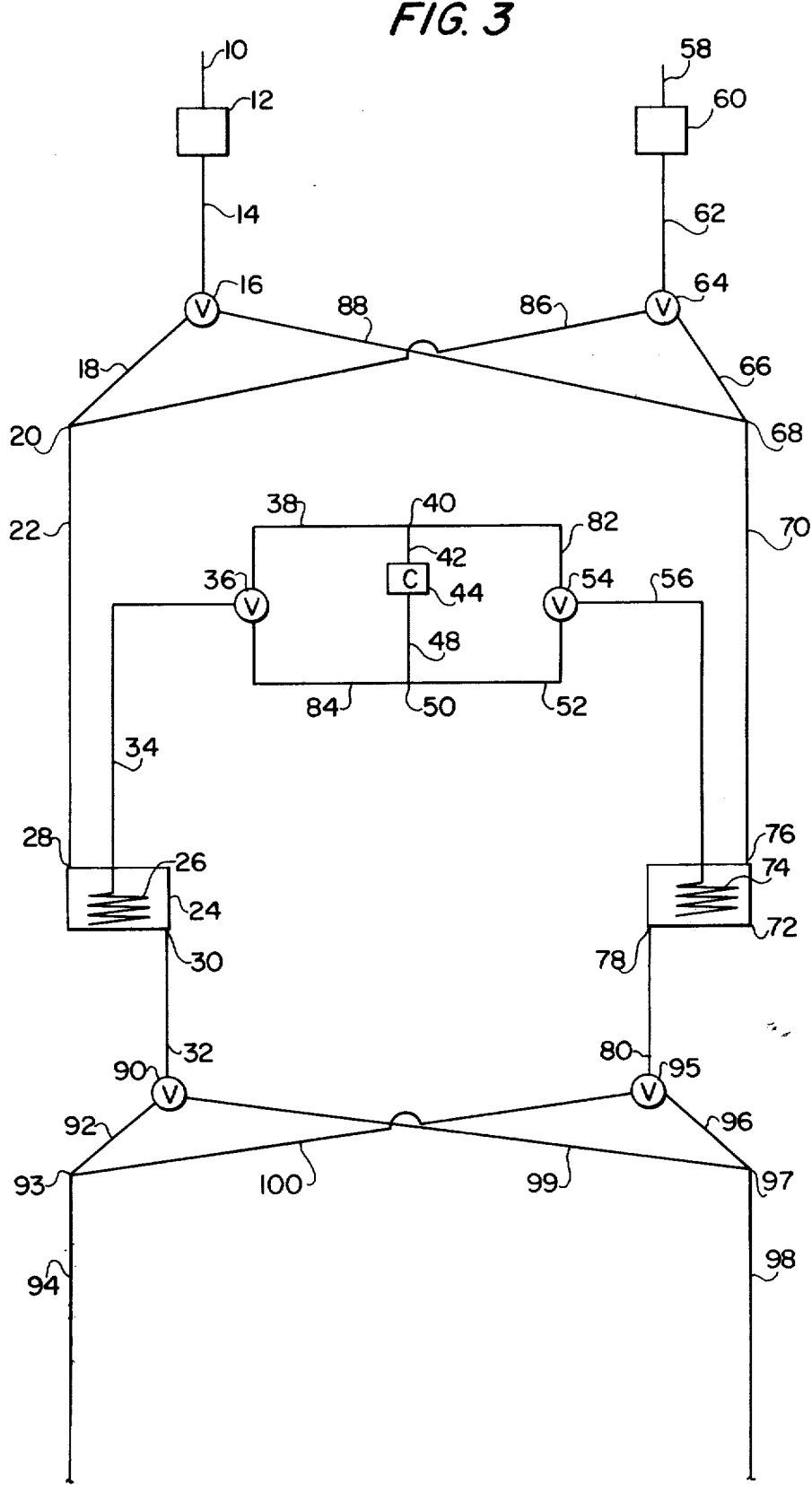
FIG. 3 illustrates a preferred embodiment of the apparatus of this invention.

A detailed disclosure of the operation of this invention is given in reference to the preferred embodiment of the apparatus schematically shown in FIG. 3. The fluid from which heat is to be extracted e.g., outside air travels through inlet conduit to impeller 12 where it is propelled through outlet conduit 14 to a switching means 16, such as a three way valve. If switching means 16 is in a first position, the fluid enters conduit 18, progresses past T-joint 20 to conduit 22 and then enters hydride container 24 through inlet 28. After passing over core 26 containing a metal hydride to this invention at certain pressure and temperature, the fluid loses heat and then passes through exit 30 into exhaust conduit 32 and into switching means 90, e.g., a three way valve. If switching means 90 is in a first position, the fluid enters conduit 92, progresses through T-joint 93 and exits through conduit 94.

The heat from the fluid is conducted into the metal hydride contained in core 26 where previously hydrogen was removed by compressor 44. Upon removal of hydrogen from the core, the equilibrium of that hydride reaction system becomes unbalanced and a quantity of hydride decomposes which decreases the energy of that system and the temperature drops accordingly. The heat from the fluid restores the reaction to equilibrium.

The removed hydrogen travels through conduit 34 to a switching means 36, e.g., a three way valve. If the valve is in a first position the hydrogen progresses through conduit 38 to and through T-union 40 and then through conduit 42. Whereupon it enters compressor 44. After the hydrogen has been compressed to the required pressure, it passes through conduit 48, through T-union 50, through conduit 52, and to switching means 54 such as a three way valve. The switching means is set so that the hydrogen progresses through conduit 56 and enters core 74 of the second hydride container 72 containing a mixture of metal and hydride of this invention at higher pressure and temperature whereupon equilibrium of that reaction system is unbalanced. The additional hydrogen reacts to form a hydride which causes the energy of the system to increase and accordingly increases the temperature.

A second fluid e.g., room air enters through inlet conduit 58 into impeller 60 such as a fan. The second fluid exits through conduit 62 and passes to switching means 64, e.g., a three way valve. If the switching means is in a first position, the second fluid progresses through conduit 66, through T-union 68 and through conduit 70 and enters second hydride container 72 through inlet 76. Whereupon it passes over core 74 and absorbs heat which was generated during the hydride formation. The fluid then passes through outlet 78 and into exhaust conduit 80 and into switching means 95, e.g., a three way valve. If switching means 95 is in a first position, the fluid enters conduit 96, progresses through T-joint 97, and exits through conduit 98.

The apparatus continues to operate in this manner until the first reaction system reaches the beginning of the two-phase region and the second reaction system reaches the end of the two-phase region. At this point the pressure in the first reaction system drops sharply. If a pressure sensor is attached to core 26 and switching means 16, 64, 36, 54, 90 and 95 are automated, the flow direction of both fluids and hydrogen can be switched automatically. If the apparatus has been calibrated, it is possible to use a timer in conjunction with the automated switches. Of course it is possible to manually switch all the switching means too.

After switching means 36 and 54 have been switched to their second positions impeller means 12 and 60 are stopped for a short period to allow temperatures in hydride containers 24 and 72 to adjust. The temperature in hydride container 72 is reduced to that of hydride container 24 in the prior condition while the temperature in hydride container 24 is increased to that of hydride container 72 in the prior condition. These adjustments are accomplished by removing hydrogen from hydride core 74 through conduit 56 to switching means 54, which is now set in the second position, through conduit 82, through T-union 40, and compressor 44. The hydrogen is compressed to the required degree and passed through conduit 48, through T-union 50, through conduit 84, through switching means 36, which is in the second position and through conduit 34 and enters core 26. When hydrogen is extracted from core 74, the hydrogen pressure is reduced, hydrogen is evolved from the hydride which extracts energy from the hydride and thus reduces the temperature of core 74 and container 72. When hydrogen at the required pressure enters core 26 the hydrogen pressure in core 26 is increased, hydrogen is absorbed by the hydride in core 26 and the energy of core 26 is increased thus increasing the temperatures of core 26 and container 24. When the temperatures of cores 26 and 74 in the second condition have reached the temperatures of cores 74 and 26, respectively, in the first condition, impellers 12 and 60 are started. The restarting of impellers 12 and 60 can be controlled manually, by a timer or by a temperature sensor in either core 26 or 74. When impellers 12 and 60 are restarted fluid passes from impeller 12 through conduit 14 through switching means 16 which is in the second position, through conduit 88, through T-union 68, through conduit 70, through entrance 76 of container 72 where it provides heat for core 74. This fluid passes out of container 72 through exit 78, through conduit 80, through switching means 95, through conduit 100, through T-union 93, and through conduit 94. Fluid to be heated is passed through conduit 58, impeller 60, conduit 62, switching means 64 which is in the second position through conduit 86, through T-union 20, through conduit 22, through entrance 28 to container 27 where it is heated by core 26, through exit 30, through conduit 32 through switching means 90, through conduit 99, through T-union 97, and through conduit 98. The system operates in this manner until the endpoint is reached. The system switches again when the endpoint is reached and the heat conducting fluids and hydrogen then pass through the first series of conduits. Materials to be used, instrumentation, and arrangement of the components are routine design decisions which need not be discussed further.

Figure 4:
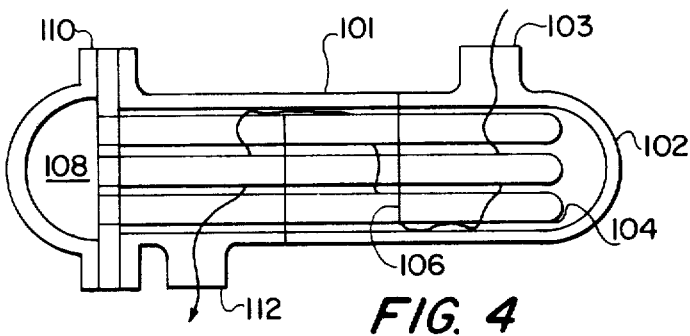
FIG. 4 illustrates a preferred embodiment of a hydride container.

A preferred embodiment of the metal hydride container is shown in FIG. 4. The container 101 comprises an outer shell 102 having an inlet 103 through which the heat conducting fluid enters the container. The metal-hydride material is inside core tubes 104 which are fixed to tube plates 106 and are arranged in the manner of a multipass heat exchanger. The tubes are connected to hydrogen cavity 108 which has an opening through which hydrogen enters or exits. The heat conducting fluid exits through outlet 112 of outer shell 102. The container is constructed from material compatable with the operating pressures, temperatures, heat conducting fluid, and requirements for high heat conduction through the core tubes.

Figure 5:
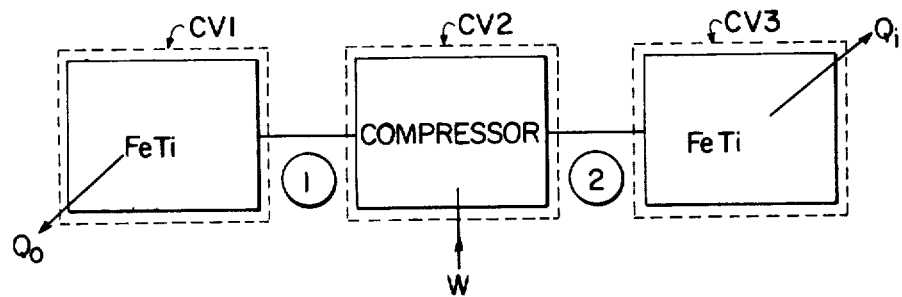
FIG. 5 illustrates another embodiment of the apparatus of this invention.

The improved efficiency of the method and apparatus of this invention is shown by the following calculations. The calculations are referenced to FIG. 5 which illustrates a simple embodiment of the apparatus of this invention.

DEFINITIONS

ROCE: rate of creation of energy

ROCM: rate of creation of mass
STE: Storage of energy
STM: Storage of mass.

For the control volumes, the conservation statements are:

| | |
|---|---|
| CV1 | ROCE = 0 = $\overline{Q_0} - \dot{m}_1 h_1 + \frac{d}{dt}$ (STE1) |
| | ROCM = 0 = $-\dot{m}_1 + \frac{d}{dt}$ (STE1) |
| CV2 | idealizations: steady flow adiabatic<br>ROCE = 0 = $m_1 h_1 - \dot{m}_2 h_2 - W$<br>ROCM = 0 = $\dot{m}_1 - \dot{m}_2$ |
| CV3 | ROCE = 0 = $\dot{m}_2 h_2 - Q_i + \frac{d}{dt}$ (STE3) |
| | ROCM = 0 = $\dot{m}_2 + \frac{d}{dt}$ (STM 3) |
| Given | 1. $H_{298} = -7200$ Btu/lbm $H_2$(The dissociation enthalpy of FeTi)<br>2. Typical insentropic efficiency for compressor = 0.90 |
| Thus | $\frac{d}{dt}$ (STE3) = $\dot{m}_2$ (7200) |
| | $\frac{d}{dt}$ (STE1) = $\dot{m}_1$ (− 7200) |
| from 4 | $\dot{m}_1 = \dot{m}_2$ |
| from 3 | $\dot{m}_1 h_1 - \dot{m}_2 h_2 = W$ |
| from 11, 12 | $\dot{m}_1 (h_1 - H_2) = W$ |
| from 1 | $Q_o = \dot{m}_1 h_1 - \frac{d}{dt}$ (STE1) |
| from 10, 14 | $Q_o = \dot{m}_1 h_1 + \dot{m}_1$ (7200) |
| from 13, 15 | COP = $\frac{Q_o}{W} = \frac{\dot{m}_1 (h_1 + 7200)}{\dot{m}_1 (h_1 - h_2)} = \frac{(h_1 + 7200)}{(h_1 - h_2)}$ |

Figure 6:
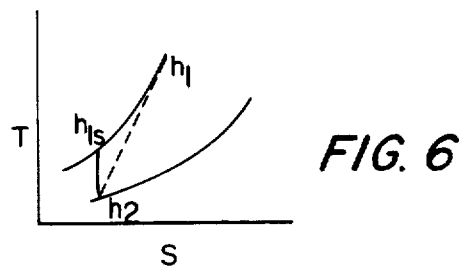
FIG. 6 shows as idealized temperature vs entropy diagram.

Now using a typical isentropic compressor efficiency with reference to FIG. 6.

$\epsilon = 0.9 = \frac{h_{1s} - h_2}{h_1 - h_2}$

So $h_1 = h_2 + (h_{1s} - h_2)/0.9$
assuming that Tatm = 40° F
$T_2 = 30°$ F  $P_2 = 1$ atm
$P_1 = 20, 30, 60$ and 70 atm.
a table can be compiled using values taken from Keanan, J. H. and Kaye, J. Gas Tables N.Y. John Wiley and Sons, 1948.

| $P_2$ | $h_{1s}$ | $h_{is}$ | $h_1$Btu/lbm | $Q_o/W$ = COP |
|---|---|---|---|---|
| 20 | 7915 | 3926.1 | 4179.5 | 4.5 |
| 30 | 8898.4 | 4413.9 | 4721.5 | 3.9 |
| 60 | 10878.8 | 5396.2 | 5813.0 | 3.1 |
| 70 | 11378.0 | 5643.8 | 6088.1 | 3.0 |

To demonstrate the operability of the present invention the following experiment is herein given.

EXAMPLE I

Figure 7:
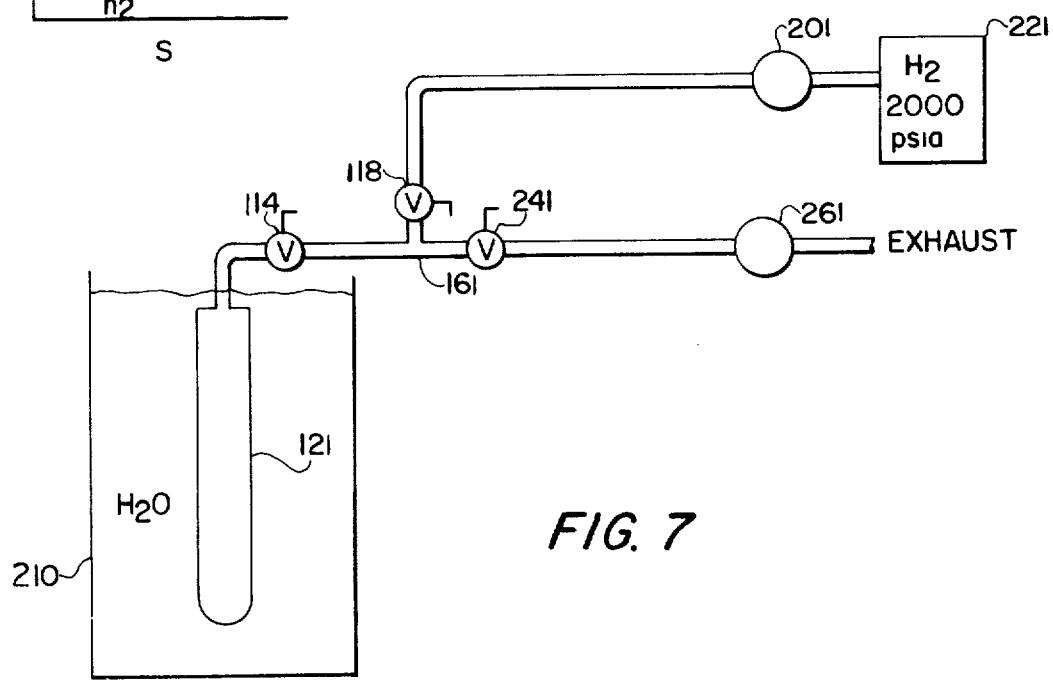
FIG. 7 illustrates experimental apparatus of Example I.

FIG. 7 shows the experimental apparatus used. The apparatus comprised a constant temperature both 210 filled with water in which container 121 containing lanthanum penta nickel was immersed. Container 121 was connected to a switching valve 114 which was connected to T-union 161 which was connected to switching valve 118 and switching valve 241. Valve 118 was connected to regulator 201 which was connected to hydrogen supply 221. Valve 24 was connected to wet test meter 261.

Hydrogen was introduced to the hydride for given periods at given pressures and then the hydride was totally desorbed to determine how much hydrogen had been absorbed. This was repeated until the hydride hydrogen composition had reached the high side of the two-phase region. To determine desorption rates hydrogen was released from the hydride at atmospheric pressure. Hydrogen evolved was measured by a wet test meter while being timed. These measurements were made at fixed both temperatures.

The results of the experiments were that hydrogen was desorbed at atmospheric pressure and 70° F, evolving 0.3 cubic feet of hydrogen in 6 minutes and that hydrogen was absorbed at 100 psi and 140° F absorbing 0.3 cubic feet of hydrogen in 6 minutes. Thus if a compressor was inserted between two containers of lanthanum penta nickel hydride which would compress hydrogen 100 psi, then heat could be transferred from a body of water at 70° F to a body of water at 140° F.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of transfering heat which comprises:
    a. establishing a two phase equilibrium at a certain pressure and temperature for a first metal-hydrogen system;
    b. establishing a two phase equilibrium at a pressure and temperature higher than said first equilibrium pressure and temperature for a second metal-hydrogen system having the same metal as said first metal-hydrogen system;
    c. removing hydrogen from said first metal-hydrogen system thereby causing a portion of said hydride to decompose and the heat content of said system to decrease;
    d. adding an amount of heat equal to the amount of lost heat to said first system, thereby returning said system to equilibrium;
    e. introducing said hydrogen into said second metal-hydrogen system thereby causing the formation of a hydride and the generation of heat;
    f. removing said heat from said second metal-hydrogen system, thereby returning said system to equilibrium.

2. the method of claim 1 which further comprises the steps of:
    g. repeating steps c-f until said two-phase equilibrium can no longer be established;
    h. establishing said equilibrium temperature and pressure of said second system at said first system;
    i. establishing said equilibrium temperature and pressure of said first system at said second system; and
    j. repeating steps g-j.

3. the method of claim 2 wherein said metal provides a metal-hydrogen system with a Δ T/Δ P ratio of at least 2.0, with an M-number of at least 650 k cal/kg, and a specific heat of at most 0.20 k cal/kg ° C 4. The method of claim 2 wherein said metal provides a metal-hydrogen system with a Δ T/Δ P ratio of at least 3.0 with an M-number of at least 1050 k cal/kg, and a specific heat of at most 0.15 k cal/kg° C.

5. The method of claim 2 wherein said metal provides a metal-hydrogen system with a Δ T/Δ P ratio of at least 3.7, with an M-number of at least 1650 k cal/kg, and a specific heat of at most 0.10 k cal/kg° C.

6. The method of claim 2 wherein said metal is selected from the class consisting of iron-titanium, lanthanum penta-nickel, mischmetal penta-nickel, and mischmetal lanthanum penta-nickel.

7. The method of claim 2 wherein said metal is selected from the class consisting of magnesium-nickel and magnesium-copper.

8. The method of claim 2 wherein said metal is selected from the class consisting of vanadium, niobium, palladium, magnesium vanadium-niobium alloy, and praseodymium penta-cobalt alloy.

9. The method of claim 6 wherein said metal is iron-titanium.

10. An apparatus for transfering heat which comprises:
   two containers, each of which comprises
      a core located inside each container;
      a mixture of a metal, the hydride of said metal, and hydrogen contained in each core;
      an inlet in each container;
      an outlet in each container; and
      an opening in each core whereby hydrogen passes;
   a gas compressing means;
   a means connecting said gas compressing means with said opening in each core of each container.

11. The apparatus of claim 10 wherein said core comprises a plurality of tubes and a means for connecting said tubes.

12. The apparatus of claim 11 wherein said metal provides a metal-hydrogen system with a $\Delta T/\Delta P$ ratio of at least 2.0, with an M-number of at least 650 k cal/kg° C, a specific heat of at most 0.20 k cal/kg° C, a maximum pressure of 60 absolute atmosphere, and a maximum reaction time of 20 minutes.

13. The apparatus of claim 11 wherein said metal provides a metal-hydrogen system with a $\Delta T/\Delta P$ ratio of at least 3.0, with an M-number of at least 1050 k cal/kg, a specific heat of at most 0.15 k cal/kg° C, a maximum pressure of 50 absolute atmospheres, and a maximum reaction time of 6 minutes.

14. The apparatus of claim 11 wherein said metal provides a metal-hydrogen system with a $\Delta T/\Delta P$ ratio of at least 3.7, with an M-number of at least 1650 k cal/kg, a specific heat of at most 0.10 k cal/kg° C, a maximum pressure of 40 absolute atmospheres, and a maximum reaction time of 5 minutes.

* * * * *